United States Patent [19]

Takahashi et al.

[11] Patent Number: 5,132,258
[45] Date of Patent: Jul. 21, 1992

[54] MICROWAVE DIELECTRIC CERAMIC COMPOSITION

[75] Inventors: Hisakazu Takahashi; Yoko Baba; Kenichi Ezaki; Yasuhiko Okamoto; Kenichi Shibata, all of Osaka; Kazuhiko Kuroki, Kyoto, all of Japan

[73] Assignee: Sanyo Electric Co., Ltd., Moriguchi, Japan

[21] Appl. No.: 747,571

[22] Filed: Aug. 20, 1991

[30] Foreign Application Priority Data

Aug. 21, 1990 [JP] Japan ................................. 2-220352
Dec. 26, 1990 [JP] Japan ................................. 2-406755
Feb. 27, 1991 [JP] Japan ................................. 3-32935

[51] Int. Cl.$^5$ .............................................. C04B 35/46
[52] U.S. Cl. ..................................... 501/134; 501/135
[58] Field of Search ................. 501/134; 252/62.3 BT

[56] References Cited

U.S. PATENT DOCUMENTS

| | | | |
|---|---|---|---|
| 4,339,543 | 7/1982 | Mage et al. | 501/134 |
| 4,665,041 | 5/1987 | Higuchi et al. | 501/134 |
| 4,785,375 | 11/1988 | Campbell | 361/321 |

*Primary Examiner*—William R. Dixon, Jr.
*Assistant Examiner*—Chris Gallo
*Attorney, Agent, or Firm*—Armstrong, Nikaido, Marmelstein, Kubovcik & Murray

[57] ABSTRACT

A microwave dielectric ceramic composition containing as main components substances expressed by a composition formula of $x \cdot TiO_2 - y \cdot ZrO_2 - z \cdot SnO_2$ (where $0.30 \leq x \leq 0.60$, $0.25 \leq y \leq 0.60$, and $0.025 \leq z \leq 0.20$) when their molar fractions are taken as x, y and z ($x+y+z=1$), and containing as additives predetermined amounts of one type selected from the group consisting of MnO, $Al_2O_3$, CuO, $Li_2O$ and $Ga_2O_3$ and predetermined amounts of one type selected from the group consisting of $Nb_2O_5$ and $Ta_2O_5$.

20 Claims, No Drawings

MICROWAVE DIELECTRIC CERAMIC COMPOSITION

BACKGROUND OF THE INVENTION

1. Field of the Invention

The present invention relates to dielectric ceramic compositions for use as resonators employed in a microwave frequency band of several gigahertz.

2. Description of the Prior Art

In recent years, attempts to use a dielectric material for a resonator or a filter have been made in satellite communication, broadcasting and microwave remote communication using a microwave having a frequency of several gigahertz or a transmitter-receiver such as a microwave remote recognition system.

Examples of this type of dielectric ceramic material conventionally used include a composition of a $BaO$-$TiO_2$-$Nd_2O_3$-$Bi_2O_3$ system which is proposed in, for example, Japanese Patent Laid-Open Gazette No. 8806/1986.

In this conventional dielectric ceramic composition, however, its dielectric constant $\epsilon$ is as large as 70 to 90, but its Q value is as small as a maximum of approximately 4700 at 1 GHz. In addition, the temperature coefficient of resonance frequency $\tau f$ of the dielectric ceramic composition is also slightly as large as $+10 \sim +20$ PPM/°C., so that sufficient properties cannot be obtained.

However, when the frequency band to be used is as high as several gigahertz, a material having a large Q value is required. For example, in a dielectric filter using a material having a high Q value, lines are easily coupled to each other so that the resonance peak is sharp, which is preferable. Consequently, a dielectric material having a high Q value is desired.

Furthermore, there are compositions of a $TiO_2$-$ZrO_2$-$SnO_2$ system which are proposed in, for example, Japanese Patent Laid-Open Gazette Nos. 192460/1990, 29009/1987, 29010/1987 and U.S. Pat. Nos. 4,339,543, 4,665,041 and 4,785,375.

In the compositions of a $TiO_2$-$ZrO_2$-$SnO_2$ system, their Q values are as high as a maximum of approximately 9000 at 7 GHz.

The inventors of the present application have examined the compositions of a $TiO_2$-$ZrO_2$-$SnO_2$ system from various points of view so as to provide a microwave dielectric ceramic composition having new composition which has a large dielectric constant and has a high Q value.

SUMMARY OF THE INVENTION

The present invention has been made in view of the above described conventional desire and has for its object to provide a microwave dielectric ceramic composition having an improved Q value.

Another object of the present invention is to achieve such a dielectric ceramic composition by sintering at a temperature which is as low as possible.

A dielectric ceramic composition according to the present invention contains as main components substances expressed by a composition formula of $x \cdot TiO_2 - y \cdot ZrO_2 - z \cdot SnO_2$ (where $0.30 \leq x \leq 0.60$, $0.25 \leq y \leq 0.60$ and $0.025 \leq z \leq 0.20$) when their molar fractions are taken as x, y and z ($x+y+z=1$) and contains as additives not more than 5 parts by weight of MnO and not more than 10 parts by weight of $Nb_2O_5$ with respect to 100 parts by weight of the main components. In the dielectric ceramic composition having the above described composition, its Q value is improved to be not less than 5000 in a microwave frequency band of approximately 7 to 8 GHz by adding MnO and $Nb_2O_5$. In addition, a dielectric ceramic having a dielectric constant of approximately 30 to 50 is provided. Furthermore, the temperature coefficient of resonance frequency $\tau f$ can be freely controlled centered at 0 PPM/°C. by changing the composition ratio of the main components and the additives.

Furthermore, the dielectric ceramic composition according to the present invention can also contain not more than 5 parts by weight of one type selected from $Al_2O_3$, CuO and $Li_2O$ in place of the above described additive MnO and 5 parts by weight of $Ta_2O_5$ in place of the above described additive $Nb_2O_5$.

Additionally, the dielectric ceramic composition according to the present invention can also contain 3 parts by weight of $Ga_2O_3$ or 5 parts by weight of $Nb_2O_5$ or $Ta_2O_5$ in place of the above described additives.

Moreover, the dielectric ceramic composition according to the present invention can be sintered at low temperature by further containing not more than 5 parts by weight of ZnO in addition to the above described additives.

The foregoing and other objects, features, aspects and advantages of the present invention will become more apparent from the following detailed description of the present invention.

DESCRIPTION OF THE PREFERRED EMBODIMENTS

Description is now made of a method of fabricating a microwave dielectric ceramic composition according to the present embodiment.

As raw materials, high-purity powders of $TiO_2$, $ZrO_2$ and $SnO_2$ were weighed so as to be predetermined molar fractions. For example, used as $TiO_2$ is one of a high-purity grade which is manufactured by Toho Titanium Co., Ltd., used as $ZrO_2$ is one of an SSA grade which is manufactured by Daiichi Kigenso Kagaku Co., Ltd., and used as $SnO_2$ is one of a reagent grade which is manufactured by Kishida Chemical Co., Ltd.

Furthermore, high-purity powders of one type of MnO, $Al_2O_3$, CuO, $Li_2O$ and $Ga_2O_3$ (which may be either an oxide or a carbonate) and one type of $Nb_2O_5$ and $Ta_2O_3$ are used as additives. Predetermined amounts of the additives were weighed. As raw materials of the additives, used as MnO, $Al_2O_3$, CuO, $Li_2O$ and $Ga_2O_3$ are ones of a reagent grade which are manufactured by Kojundo Kagaku Co., Ltd., and used as $Nb_2O_5$ and $Ta_2O_5$ are ones of a high-purity grade which are manufactured by Mitsui Mining and Smelting Co., Ltd.

Description is now made of a specific example of the fabrication of the microwave dielectric ceramic composition according to the present embodiment using the above described raw materials.

First, as molar fractions of $TiO_2$, $ZrO_2$ and $SnO_2$, $TiO_2$ shall be 0.51 mole, $ZrO_2$ shall be 0.42 mole, and $SnO_2$ shall be 0.07 mole. Description is made of a dielectric ceramic composition containing 1.0 part by weight of MnO and 2.5 parts by weight of $Nb_2O_5$ added to 100 parts by weight of the three main components.

39.453 g of $TiO_2$, 50.220 g of $ZrO_2$ and 10.237 g of $SnO_2$ were respectively weighed using an electronic scale FR-200 manufactured by A&D Company so as to be the above described molar fractions. 1.0 g of MnO and 2.5 g of Nb$_2$O$_5$ were similarly weighed with respect to 100 g of the three main components.

The raw material powders, a nylon ball of 15$\phi$ and pure water were put in a nylon pot, mixed in the following condition and wet-blended for eight hours.

Raw material powders:Nylon ball:Water = 100 g:500 g:500 cc

The blended powder was then dehydrated and dried at 120° C. for 24 hours. The dried powder was crushed in a mortar made of alumina. The crushed powder was packed in a boat made of magnesia (MgO) and calcined at 900° to 1200° C. and particularly, at 1150° C. in the present embodiment for two hours. The calcined powder is crushed again in the mortar.

This crushed powder was put in the nylon pot in the following condition and water-ground for 20 to 60 hours and particularly, for 30 hours in the present embodiment.

Crushed powder:Nylon ball:Water = 100 g:1000 g:500 cc

Subsequently, this ground powder was dehydrated and dried at 120° C. for 24 hours. The dried ground powder was crushed, and a 10% solution of polyvinyl alcohol is mixed as a binder so as to account for three percent of 50 g of the powder using the mortar to granulate the powder. The granulated powder was dried at 100° C. for five hours.

Thereafter, the dried powder was classified using two types of screens, that is, a 100-mesh screen (150 $\mu$m) and a 200-mesh screen (75 $\mu$m), to take out only grains having a diameter of 75 to 150 $\mu$m.

The classified powder was presed into a disc having a diameter of 10 mm and a thickness of 6 mm at pressure of 2000 to 3000 Kg/cm$^2$ and particularly, 2550 Kg/cm$^2$ in the present embodiment.

Subsequently, the pressed forming powder was put in a boat for sintering made of alumina with a plate made of zirconia (ZrO$_2$) being laid on the bottom thereof, and was held and sintered for two hours at 350° C., for two hours at 600° C. and for five hours at 1450° C. at a heating rate of 150° C./H. Both surfaces of the sintered object were polished using abrasive powder FP-800# manufactured by, for example, Fujimi Abrasive Co., Ltd. such that the thickness of the sintered body is one-half of the diameter thereof. In addition, both surfaces of the polished object were polished clean again using wet abrasive paper 1500#. Thereafter, the polished object was ultrasonicain/cleaned by acetone and finally, dried at 100° C. for two hours to prepare a sample.

The dielectric constant $\epsilon$ and the Q value of the sample thus prepared were measured using a network analyzer (YHP 8510B) in the range of the measurement frequencies 7 to 8.5 GHz using a dielectric resonator method (Hakki-Coleman method). In addition, the temperature coefficient of resonance frequency $\tau f$ was calculated from the following equation by putting a measuring system in a constant temperature bath to measure the change in resonance frequency at 20° to 70° C.:

$$\tau f = \frac{F_{70} - F_{20}}{F_{20} \times \Delta T} \times 10^6 \text{ (PPM/°C.)}$$

where $F_{70}$ denotes a resonance frequency at 70° C., $F_{20}$ denotes a resonance frequency at 20° C., and $\Delta T$ denotes a temperature difference.

The following show the results of measurements made with respect to samples similarly prepared by the above described process.

The composition ratio of TiO$_2$, ZrO$_2$ and SnO$_2$ which are main components is 0.51:0.42:0.07 in this order in terms of molar fractions, as in the above described embodiment. Samples are prepared in the same manner as the above described process by changing the parts of weight of MnO and Nb$_2$O$_5$ serving as additives as shown in Table 1. The results of measurements made of dielectric properties of the samples are shown in Table 1.

In the table 1, asterisked samples are samples beyond the scope of the present invention.

[TABLE 1]

| sample number | composition (part by weight) | | dielectric properties | | note |
|---|---|---|---|---|---|
| | MnO | Nb$_2$O$_5$ | dielectric constant $\epsilon$ | Q value | |
| *1 | 0.0 | 0.0 | 36.0 | 4500 | |
| *2 | 1.0 | 0.0 | 36.8 | 4800 | |
| 3 | 1.0 | 1.0 | 37.8 | 7700 | |
| 4 | 1.0 | 2.5 | 37.3 | 8500 | |
| 5 | 1.0 | 5.0 | 37.6 | 8100 | |
| 6 | 2.5 | 1.0 | 36.9 | 8600 | |
| 7 | 2.5 | 2.5 | 37.3 | 8700 | |
| 8 | 2.5 | 5.0 | 37.4 | 8000 | |
| 9 | 2.5 | 10.0 | 37.1 | 5400 | |
| *10 | 2.5 | 20.0 | — | — | impossible to sinter |
| 11 | 5.0 | 1.0 | 37.5 | 7800 | |
| 12 | 5.0 | 2.5 | 37.0 | 7100 | |
| *13 | 10.0 | 1.0 | 36.7 | 4800 | |
| *14 | 10.0 | 2.5 | 36.6 | 4600 | |

When the temperature coefficients of resonance frequency $\tau f$ are respectively measured in the range of +20° C.~+70° C. with respect to the samples in the table 1, their values are all within the range of +8±10 (PPM/°C.).

As obvious from the table 1, the dielectric constant $\epsilon$ and the Q value are improved by adding MnO and Nb$_2$O$_5$.

On the other hand, if the amount of addition of MnO exceeds 5 parts by weight or the amount of addition of Nb$_2$O$_5$ exceeds 10 parts by weight, the samples are not so superior in dielectric properties and may, in some case, be inferior in sintering.

Meanwhile, the dielectric properties are changed depending on the composition ratio of TiO$_2$, ZrO$_2$ and SnO$_2$ which are main components.

Then, 1.0 part by weight of MnO and 2.5 parts by weight of Nb$_2$O$_5$ shall be added. The results of experiments made by changing the composition ratio (molar ratio) of TiO$_2$, ZrO$_2$ and SnO$_2$ are shown in Table 2.

[TABLE 2]

| sample number | composition (mole %) | | | dielectric properties | | |
|---|---|---|---|---|---|---|
| | TiO$_2$ | ZrO$_2$ | SnO$_2$ | dielectric constant $\epsilon$ | Q value | $\tau f$(PPM/°C.) |
| *15 | 0.65 | 0.25 | 0.10 | 56.5 | 7900 | +220 |
| 16 | 0.60 | 0.375 | 0.025 | 43.0 | 7500 | +82 |
| 17 | 0.60 | 0.25 | 0.15 | 49.5 | 7800 | +147 |
| *18 | 0.60 | 0.20 | 2.20 | 43.1 | 4300 | +62 |

[TABLE 2]-continued

| sample number | composition (mole %) | | | dielectric properties | | |
|---|---|---|---|---|---|---|
| | TiO$_2$ | ZrO$_2$ | SnO$_2$ | dielectric constant ε | Q value | τf(PPM/°C.) |
| 19 | 0.55 | 0.40 | 0.05 | 40.8 | 8400 | +27 |
| 20 | 0.55 | 0.35 | 0.10 | 40.4 | 8300 | +41 |
| 21 | 0.55 | 0.25 | 0.20 | 44.5 | 7200 | +114 |
| *22 | 0.50 | 0.49 | 0.01 | 39.8 | 4100 | +47 |
| 23 | 0.50 | 0.45 | 0.05 | 38.4 | 8100 | +9 |
| 24 | 0.50 | 0.40 | 0.10 | 37.0 | 8500 | +10 |
| *25 | 0.50 | 0.25 | 0.25 | 40.5 | 4100 | +97 |
| 26 | 0.40 | 0.50 | 0.10 | 31.9 | 5700 | +1 |
| 27 | 0.375 | 0.60 | 0.025 | 31.1 | 5000 | +19 |
| 28 | 0.30 | 0.60 | 0.10 | 34.0 | 5200 | −13 |
| 29 | 0.30 | 0.50 | 0.20 | 30.2 | 5100 | −18 |
| *30 | 0.25 | 0.65 | 0.10 | 27.3 | 3500 | −14 |

As obvious from the table 2, the dielectric constant ε, the Q value and the coefficient of resonance frequency τf are changed depending on the composition ratio of TiO$_2$, ZrO$_2$ and SnO$_2$.

In the present invention, the molar fractions of TiO$_2$, ZrO$_2$ and SnO$_2$ which are main components are limited. More specifically, TiO$_2$ is limited to not less than 0.3 mole nor more than 0.60 mole, ZrO$_2$ is limited to not less than 0.25 mole nor more than 0.60 mole, and SnO$_2$ is limited to not less than 0.025 nor more than 0.20 mole.

The reason why the molar fractions are limited is as follows. More specifically, τf is too large on the plus side when TiO$_2$ is not less than 0.60 mole, and ε is small when it is not more than 0.3 mole. In addition, the Q value is lower when ZrO$_2$ is not more than 0.25 mole nor less than 0.6 mole. Furthermore, the Q value is lower when SnO$_2$ is not more than 0.025 mole nor less than 0.2 mole, which is not suitable for practical applications.

Dielectric properties obtained when MnO is replaced with Al$_2$O$_3$, CuO and Li$_2$O as an additive are shown in Table 3 to Table 5. The composition ratio of TiO$_2$, ZrO$_2$ and SnO$_2$ which are main components is 0.51:0.42:0.47 in this order in terms of molar fractions.

[TABLE 3]

| sample number | composition (part by weight) | | dielectric properties | | note |
|---|---|---|---|---|---|
| | Al$_2$O$_3$ | Nb$_2$O$_5$ | dielectric constant ε | Q value | |
| *31 | 1.0 | 0.0 | 36.1 | 4700 | |
| 32 | 1.0 | 1.0 | 36.8 | 6800 | |
| 33 | 1.0 | 2.5 | 37.0 | 8000 | |
| 34 | 1.0 | 5.0 | 37.2 | 7600 | |
| 35 | 2.5 | 2.5 | 37.1 | 8100 | |
| 36 | 2.5 | 5.0 | 37.4 | 7700 | |
| 37 | 2.5 | 10.0 | 36.9 | 5200 | |
| *38 | 2.5 | 20.0 | — | — | impossible to sinter |
| 39 | 5.0 | 1.0 | 36.7 | 7800 | |
| 40 | 5.0 | 2.5 | 36.5 | 7400 | |
| *41 | 10.0 | 1.0 | — | — | impossible to measure |
| *42 | 10.0 | 2.5 | — | — | impossible to measure |

[TABLE 4]

| sample number | composition (part by weight) | | dielectric properties | | note |
|---|---|---|---|---|---|
| | CuO | Nb$_2$O$_5$ | dielectric constant ε | Q value | |
| *43 | 1.0 | 0.0 | 35.7 | 4600 | |
| 44 | 1.0 | 2.5 | 36.7 | 7800 | |
| 45 | 1.0 | 5.0 | 37.0 | 7400 | |
| 46 | 2.5 | 2.5 | 37.1 | 7600 | |
| 47 | 2.5 | 5.0 | 37.3 | 7400 | |
| 48 | 2.5 | 10.0 | 36.6 | 5400 | |

[TABLE 4]-continued

| sample number | composition (part by weight) | | dielectric properties | | note |
|---|---|---|---|---|---|
| | CuO | Nb$_2$O$_5$ | dielectric constant ε | Q value | |
| *49 | 2.5 | 20.0 | — | — | impossible to sinter |
| 50 | 5.0 | 2.5 | 36.4 | 7100 | |
| *51 | 10.0 | 2.5 | — | — | impossible to measure |

[TABLE 5]

| sample number | composition (part by weight) | | dielectric properties | | note |
|---|---|---|---|---|---|
| | Li$_2$O | Nb$_2$O$_5$ | dielectric constant ε | Q value | |
| *52 | 1.0 | 0.0 | 35.3 | 4500 | |
| 53 | 1.0 | 2.5 | 36.1 | 7400 | |
| 54 | 1.0 | 5.0 | 36.3 | 7200 | |
| 55 | 2.5 | 2.5 | 36.5 | 7500 | |
| 56 | 2.5 | 5.0 | 36.7 | 7300 | |
| 57 | 2.5 | 10.0 | 36.4 | 5200 | |
| 58 | 2.5 | 20.0 | — | — | impossible to sinter |
| 59 | 5.0 | 2.5 | 36.2 | 7200 | |
| *60 | 10.0 | 2.5 | — | — | impossible to measure |

As obvious from the tables 3 to 5, the same results as the results shown in the previous table 1 are obtained.

Meanwhile, the temperature coefficients of resonance frequency τf are all within +10±10 (PPM/°C.).

Consequently, if TiO$_2$, ZrO$_2$ and SnO$_2$ which are main components are in the range of the above described molar fractions from the table 2, and MnO, Al$_2$O$_3$, CuO or Li$_2$O and Nb$_2$O$_5$ which are additives are respectively not more than 5 parts by weight and not more than 10 parts by weight from the tables 1, 3, 4 and 5, a dielectric ceramic having a dielectric constant ε of approximately 30 to 50 and having a Q value of not less than approximately 5000 can be freely obtained.

Dielectric properties obtained when Li$_2$O and Ta$_2$O$_5$ are added as additives to main components are then shown in Table 6.

Meanwhile, the composition ratio of TiO$_2$, ZrO$_2$ and SnO$_2$ which are main components is 0.51:0.42:0.07 in this order in terms of molar fractions, and a method of preparing samples to be measured is the same as the above described method.

[TABLE 6]

| sample number | composition (part by weight) | | dielectric properties | | note |
|---|---|---|---|---|---|
| | Li$_2$O | Ta$_2$O$_5$ | dielectric constant ε | Q value | |
| *61 | 1.0 | 0.0 | 36.0 | 4500 | |

[TABLE 6]-continued

| sample number | composition (part by weight) Li$_2$O | Ta$_2$O$_5$ | dielectric properties dielectric constant ε | Q value | note |
|---|---|---|---|---|---|
| 62 | 1.0 | 0.0 | 35.0 | 5200 | |
| 63 | 1.0 | 2.5 | 36.1 | 6900 | |
| 64 | 1.0 | 5.0 | 36.5 | 6800 | |
| 65 | 2.5 | 2.5 | 36.7 | 7200 | |
| 66 | 2.5 | 5.0 | 36.8 | 7000 | |
| 67 | 2.5 | 20.0 | — | — | impossible to sinter |
| 68 | 5.0 | 2.5 | 36.3 | 6400 | |
| *69 | 10.0 | 2.5 | — | — | impossible to sinter |

In the table 6, the temperature coefficients of resonance frequency τf of the samples are all within +10±10 (PPM/+C.).

As can be seen from the table 6, when Li$_2$O and Ta$_2$O$_5$ are added, the dielectric constant ε and the Q value are both improved. In addition, when the amount of addition of Li$_2$O exceeds 5 parts by weight and the amount of addition of Ta$_2$O$_5$ exceeds 10 parts by weight similarly to the above described additives, it is impossible to sinter the samples, which is unfavorable.

Dielectric properties obtained when Ga$_2$O$_3$ and Nb$_2$O$_5$ are used as additives are then shown in Table 7. The composition ratio of TiO$_2$, ZrO$_2$ and SnO$_2$ which are main components is 0.51:0.42:0.07 in this order in terms of molar fractions.

In the table 7, asterisked samples are samples beyond the scope of the present invention.

[TABLE 7]

| sample number | composition (part by weight) Ga$_2$O$_3$ | Nb$_2$O$_5$ | dielectric properties dielectric constant ε | Q value | note |
|---|---|---|---|---|---|
| *70 | 0.0 | 0.0 | 36.0 | 4500 | |
| *71 | 1.0 | 0.0 | 35.7 | 4800 | |
| 72 | 1.0 | 1.0 | 35.5 | 5800 | |
| 73 | 1.0 | 2.5 | 35.4 | 6200 | |
| 74 | 2.0 | 2.5 | 35.2 | 6400 | |
| 75 | 2.0 | 5.0 | 35.1 | 5900 | |
| *76 | 2.0 | 7.5 | — | — | inferior in sintering |
| 77 | 3.0 | 2.5 | 35.3 | 6300 | |
| *78 | 5.0 | 2.5 | 34.1 | 4400 | |

When the temperature coefficients of resonance frequency τf are measured in the range of +20° C.~+70° C. with respect to the samples shown in the table 7, their values are all within +4±10 (PPM/°C.).

As can be seen from the table 7, the dielectric constant ε and the Q value are increased by adding Ga$_2$O$_3$ and Nb$_2$O$_5$.

However, when the amount of addition of Ga$_2$O$_3$ exceeds 3 parts by weight, the dielectric properties of the samples are conversely degraded. On the other hand, when the amount of addition of Nb$_2$O$_5$ exceeds 5 parts by weight, the sample is inferior in sintering.

Table 8 shows the results of measurements made when the composition ratio of TiO$_2$, ZrO$_2$ and SnO$_2$ which are main components is 0.51:0.42:0.07 in this order in terms of molar fractions, and Ga$_2$O$_3$ and Ta$_2$O$_5$ are used as additives.

[TABLE 8]

| sample number | composition (part by weight) Ga$_2$O$_3$ | Ta$_2$O$_5$ | dielectric properties dielectric constant ε | Q value | note |
|---|---|---|---|---|---|
| *79 | 0.0 | 0.0 | 36.0 | 4500 | |
| *80 | 1.0 | 0.0 | 35.7 | 4800 | |
| 81 | 1.0 | 1.0 | 36.3 | 5300 | |
| 82 | 1.0 | 2.5 | 36.5 | 5600 | |
| 83 | 2.0 | 2.5 | 37.7 | 6000 | |
| 84 | 2.0 | 5.0 | 37.1 | 5400 | |
| *85 | 2.0 | 7.5 | 35.3 | 4100 | sintering properties degraded |
| 86 | 3.0 | 2.5 | 37.4 | 5600 | |
| *87 | 5.0 | 2.5 | 35.5 | 4600 | |

When the temperature coefficient of resonance frequency τf are measured in the range of +20° C.~+70° C. with respect to the samples in the table 8, their values are all within +6±10 (PPM/°C.).

As can be seen from the table 8, the dielectric constant ε and the Q value are increased by adding Ga$_2$O$_3$ and Ta$_2$O$_5$.

However, when the amount of addition of Ga$_2$O$_3$ exceeds 3 parts by weight, the dielectric properties of the samples are conversely degraded. On the other hand, when the amount of addition of Nb$_2$O$_5$ exceeds 5 parts by weight, sintering properties of the sample are degraded.

Meanwhile, in the above described embodiment, the sintering temperature must be not less than 1400° C. in the fabricating processes so as to obtain superior dielectric properties. In consideration of the production cost and the durability of a sintering furnace and the like, however, it is preferable that the sintering temperature is as low as possible. Description is now made of an embodiment in which the sintering temperature can be lowered.

Table 9 shows dielectric properties of samples obtained by adding 1.0 parts by weight of Li$_2$O and 2.5 parts by weight of Nb$_2$O$_5$ to TiO$_2$, ZrO$_2$ and SnO$_2$ which are main components (the composition ratio: 0.51:0.42:0.07) and further adding ZnO. At this time, the sintering temperature is 1350° C. or 1400° C., and the sintering time is 5 hours.

[TABLE 9]

| sample number | ZnO (part by weight) | dielectric properties dielectric constant ε | Q value | sintering temperature (°C.) | note |
|---|---|---|---|---|---|
| *88 | 0.0 | 36.0 | 7200 | 1400 | |
| 89 | 0.5 | 36.2 | 7400 | 1400 | |
| *90 | 0.0 | 35.3 | 6300 | 1350 | |
| 91 | 0.5 | 35.7 | 6800 | 1350 | |
| 92 | 1.0 | 36.5 | 7500 | 1400 | |
| 93 | 1.0 | 36.2 | 6900 | 1350 | |
| 94 | 2.5 | 37.0 | 7600 | 1400 | |
| 95 | 2.5 | 36.7 | 7400 | 1350 | |
| 96 | 5.0 | 37.0 | 7500 | 1400 | |
| 97 | 5.0 | 36.6 | 7400 | 1350 | |
| *98 | 10.0 | 34.2 | 4300 | 1400 | melted body deposited |

[TABLE 9]-continued

| sample number | ZnO (part by weight) | dielectric properties dielectric constant ε | Q value | sintering temperature (°C.) | note |
|---|---|---|---|---|---|
| *99 | 10.0 | 33.1 | 4000 | 1350 | melted body deposited |

As can be seen from the table 9, even when the sintering temperature is lowered, the same or better dielectric properties as or than the time when the sintering temperature is high are obtained by adding ZnO.

When the amount of addition of ZnO exceeds 5 parts by weight, a melted body is deposited at the time of sintering, so that the dielectric properties are conversely degraded.

Table 10 shows the effect of the addition of ZnO obtained when the following four types of combinations are used as additives to main components. At this time, the sintering temperature is 1350° C., and the sintering time is 5 hours.

A; $MnO = 1.0$ part by weight, $Nb_2O_5 = 2.5$ parts by weight

B; $Al_2O_3 = 1.0$ part by weight, $Nb_2O_5 = 2.5$ parts by weight

C; $CuO = 1.0$ part by weight, $Nb_2O_5 = 2.5$ parts by weight

D; $Li_2O = 1.0$ part by weight, $Ta_2O_5 = 2.5$ parts by weight

[TABLE 10]

| sample number | additive (part by weight) | ZnO (part by weight) | dielectric properties dielectric constant ε | Q value | sintering temperature (°C.) |
|---|---|---|---|---|---|
| 100 | A | 0.0 | 35.8 | 6700 | 1350 |
| 101 | A | 1.0 | 36.9 | 7200 | 1350 |
| 102 | B | 0.0 | 35.1 | 5700 | 1350 |
| 103 | B | 1.0 | 36.5 | 6400 | 1350 |
| 104 | C | 0.0 | 35.3 | 5200 | 1350 |
| 105 | C | 1.0 | 36.2 | 6000 | 1350 |
| 106 | D | 0.0 | 34.8 | 4700 | 1350 |
| 107 | D | 1.0 | 35.7 | 5700 | 1350 |

As can be seen from the table 10, even if the sintering temperature is low, the dielectric properties can be improved by adding ZnO in either case.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microwave dielectric ceramic composition consisting essentially of as main components substances expressed by a composition formula of $x \cdot TiO_2 - y \cdot ZrO_2 - z \cdot SnO_2$, where $0.30 \leq x \leq 0.60$, $0.25 \leq y \leq 0.60$, and $0.025 \leq z \leq 0.20$ when their molar fractions are taken as x, y and z such that $x + y + z = 1$ and containing as a first additive at least one member selected from the group consisting of MnO, $Al_2O_3$, CuO, $Li_2O$ and $Ga_2O_3$ and at least one second additive selected from the group consisting of $Nb_2O_5$ and $Ta_2O_5$, such that said first and second additives are present in respective amounts which are effective to raise a Q value of said composition to at least 5,000.

2. The microwave dielectric ceramic composition according to claim 1, which contains as first and second additives not more than 5 parts by weight of said MnO and not more than 10 parts by weight of said $Nb_2O_5$ with respect to 100 parts by weight of said substances which are main components.

3. The microwave dielectric ceramic composition according to claim 1, which contains as first and second additives not more than 5 parts by weight of said $Al_2O_3$ and not more than 10 parts by weight of said $Nb_2O_5$ with respect to 100 parts by weight of said substances which are main components.

4. The microwave dielectric ceramic composition according to claim 1, which contains as first and second additives not more than 5 parts by weight of said CuO and not more than 10 parts by weight of said $Nb_2O_5$ with respect to 100 parts by weight of said substances which are main components.

5. The microwave dielectric ceramic composition according to claim 1, which contains as first and second additives not more than 5 parts by weight of said $Li_2O$ and not more than 10 parts by weight of said $Nb_2O_5$ with respect to 100 parts by weight of said substances which are main components.

6. The microwave dielectric ceramic composition according to claim 1, which contains as first and second additives not more than 5 parts by weight of said MnO and not more than 10 parts by weight of said $Ta_2O_5$ with respect to 100 parts by weight of said substances which are main components.

7. The microwave dielectric ceramic composition according to claim 1, which contains as first and second additives not more than 5 parts by weight of said $Al_2O_3$ and not more than 10 parts by weight of said $Ta_2O_5$ with respect to 100 parts by weight of said substances which are main components.

8. The microwave dielectric ceramic composition according to claim 1, which contains as first and second additives not more than 5 parts by weight of said CuO and not more than 10 parts by weight of said $Ta_2O_5$ with respect to 100 parts by weight of said substances which are main components.

9. The microwave dielectric ceramic composition according to claim 1, which contains as first and second additives not more than 5 parts by weight of said $Li_2O$ and not more than 10 parts by weight of $Ta_2O_5$ with respect to 100 parts by weight of said substances which are main components.

10. The microwave dielectric ceramic composition according to claim 1, which contains as first and second additives not more than 3 parts by weight of said $Ga_2O_3$ and not more than 5 parts by weight of said $Nb_2O_5$ with respect to 100 parts by weight of said substances which are main components.

11. The microwave dielectric ceramic composition according to claim 1, which contains as first and second additives not more than 3 parts by weight of said $Ga_2O_3$ and not more than 5 parts by weight of said $Ta_2O_5$ with respect to 100 parts by weight of said substances which are main components.

12. A microwave dielectric ceramic composition consisting essentially of as main components substances expressed by a composition formula of $x \cdot TiO_2 - y \cdot ZrO_2 - z \cdot SnO_2$, wherein $0.30 \leq x \leq 0.60$, $0.25 \leq y \leq 0.60$, and $0.025 \leq z \leq 0.20$ when their molar fractions are taken as x, y and z such that x+y+z=1 and containing as a first additive at least one member selected from the group consisting of MnO, $Al_2O_3$, CuO, $Li_2O$ and $Ga_2O_3$ and at least one second additive selected from the group consisting of $Nb_2O_5$ and $Ta_2O_5$, and an amount opf ZnO which is effective to lower the sintering temperature of said composition, and wherein said first and second additives are present in respective amounts which are effective to raise a Q value of said composition to at least 5,000.

13. The microwave dielectric ceramic composition according to claim 12, which contains as first and second additives not more than 5 parts by weight of said MnO, not more than 10 parts by weight of said $Nb_2O_5$ and not more than 5 parts by weight of said ZnO with respect to 100 parts by weight of said substances which are main components.

14. The microwave dielectric ceramic composition according to claim 12, which contains as first and second additives not more than 5 parts by weight of said $Al_2O_3$, 10 parts by weight of said $Nb_2O_5$ and not more than 5 parts by weight of said ZnO with respect to 100 parts by weight of said substances which are main components.

15. The microwave dielectric ceramic composition according to claim 12, which contains as first and second additives not more than 5 parts by weight of said CuO, not more than 10 parts by weight of said $Nb_2O_5$ and not more than 5 parts by weight of said ZnO with respect to 100 parts by weight of said substances which are main components.

16. The microwave dielectric ceramic composition according to claim 12, which contains as first and second additives not more than 5 parts by weight of said $Li_2O$, not more than 10 parts by weight of said $Nb_2O_5$ and not more than 5 parts by weight of said ZnO with respect to 100 parts by weight of said substances which are main components.

17. The microwave dielectric ceramic composition according to claim 12, which contains not more than 5 parts by weight of said MnO, not more than 10 parts by weight of said $Ta_2O_5$ as first and second additives, respectively, and not more than 5 parts by weight of said ZnO with respect to 100 parts by weight of said substances which are main components.

18. The microwave dielectric ceramic composition according to claim 12, which contains as first and second additives not more than 5 parts by weight of said $Al_2O_3$, 10 parts by weight of said $Ta_2O_5$ and not more than 5 parts by weight of said ZnO with respect to 100 parts by weight of said substances which are main components.

19. The microwave dielectric ceramic composition according to claim 12, which contains as first and second additives not more than 5 parts by weight of said CuO, not more than 10 parts by weight of said $Ta_2O_5$ and not more than 5 parts by weight of said ZnO with respect to 100 parts by weight of said substances which are main components.

20. The microwave dielectric ceramic composition according to claim 12, which contains as first and second additives not more than 5 parts by weight of said $Li_2O$, 10 parts by weight of said $Ta_2O_5$ and not more than 5 parts by weight of said ZnO with respect to 100 parts by weight of said substances which are main components.

* * * * *